United States Patent
Kawamura

(10) Patent No.: US 8,094,246 B2
(45) Date of Patent: *Jan. 10, 2012

(54) POLARIZATION CONVERSION DEVICE, POLARIZED ILLUMINATION OPTICAL DEVICE, AND LIQUID CRYSTAL PROJECTOR

(75) Inventor: Yoshiji Kawamura, Sano (JP)

(73) Assignee: FUJIFILM Corporation, Tokyo (JP)

( * ) Notice: Subject to any disclaimer, the term of this patent is extended or adjusted under 35 U.S.C. 154(b) by 43 days.

This patent is subject to a terminal disclaimer.

(21) Appl. No.: 12/708,215

(22) Filed: Feb. 18, 2010

(65) Prior Publication Data

US 2010/0245691 A1 Sep. 30, 2010

(30) Foreign Application Priority Data

Mar. 26, 2009 (JP) .............................. P2009-076845

(51) Int. Cl.
*G02F 1/1335* (2006.01)
(52) U.S. Cl. ........... 349/9; 349/1; 349/5; 349/8; 349/56; 349/57
(58) Field of Classification Search .................. 349/1, 5, 349/8, 9, 56, 57, 84, 96
See application file for complete search history.

(56) References Cited

U.S. PATENT DOCUMENTS

2010/0245690 A1* 9/2010 Kawamura ......................... 349/9

FOREIGN PATENT DOCUMENTS

| JP | 2006-064871 A | 3/2006 |
| JP | 2008-129190 A | 6/2008 |

* cited by examiner

*Primary Examiner* — Jennifer Doan
(74) *Attorney, Agent, or Firm* — Birch, Stewart, Kolasch & Birch, LLP

(57) ABSTRACT

A polarizing split layer and a reflection layer are alternately provided on bonding surfaces between prism rods which constitute a polarized beam splitter array. Polarization conversion devices are bonded to emission surfaces of the prism rods from which linearly polarized light being reflected by the polarizing split layers and being reflected by the reflection layer are emitted. In the polarization conversion device, each edge line of a rectangular prism element is inclined by 45° with respect to a polarization direction of linearly polarized light being incident. On each inclined surface of the rectangular prism element, a retardation film whose optical axis matches the normal line of the inclined surface is formed. The retardation film serves as a uniaxial negative C plate which gives a phase difference of a ½ wavelength to incident light.

20 Claims, 9 Drawing Sheets

POLARIZATION CONVERSION DEVICE, POLARIZED ILLUMINATION OPTICAL DEVICE, AND LIQUID CRYSTAL PROJECTOR

CROSS-REFERENCE TO RELATED APPLICATIONS

This application is based upon and claims the benefit of priority from Japanese Patent Application No. 2009-76845 filed on Mar. 26, 2009; the entire contents of which are incorporated herein by reference

BACKGROUND OF THE INVENTION

1. Technical Field

The invention relates to a polarization conversion device which rotates a polarization direction of linearly polarized light by 90°, a polarized illumination optical device which converts non-polarized illumination light into illumination light of linearly polarized light having a fixed polarization direction by the polarization conversion device, and an liquid crystal projector which uses the polarized illumination optical device in an illumination optical system.

2. Description of the Related Art

Various kinds of liquid crystal projectors that illuminate an image, which is displayed on a liquid crystal display panel, with light from a light source lamp for projection onto a screen are commercially available. As is known well, a liquid crystal display panel includes a liquid crystal layer having a predetermined thickness, in which liquid crystal molecules are sealed, and a polarizer and an analyzer which are disposed on an incidence surface side and an emission surface side of the liquid crystal layer, respectively. The polarizer and the analyzer are disposed so that polarization directions of them are perpendicular or parallel to each other. The polarizer and the analyzer control passage of linearly polarized light, which is incident on the liquid crystal layer, according to an orientation state of liquid crystal molecules, and adjust a light amount of linearly polarized light which is emitted through the analyzer.

On the other hand, generally, a polarization conversion device which converts non-polarized light from a light source into linearly polarized light having the same polarization direction as the polarizer of the liquid crystal display panel is used in the illumination optical system of the liquid crystal projector. As described in JP 2008-129190 A, a prism array obtained by combining a polarized beam splitter and a ½ wavelength plate is often used as such a polarization conversion device. The polarized beam splitter has a polarization split surface which transmits one of two kinds of linearly polarized light beams whose polarization directions are perpendicular to each other, and reflects the other one. The polarized beam splitter rotates the polarization direction of either one of the two kinds of linearly polarized light, which are separated on the polarization split surface, by 90° using the ½ wavelength plate and combines it with the other linearly polarized light, thereby obtaining linearly polarized light whose polarization directions are aligned.

Most of known ½ wavelength plates are formed of a film sheet using an organic material. Accordingly, if the ½ wavelength plates are used near the light source for a long time, discoloration easily occurs and the polarization conversion efficiency is deteriorated. In order to improve the thermal resistance, it has been proposed to use a birefringent crystalline substance, such as crystal, as the ½ wavelength plate. However, not only the crystal itself is expensive, but also the manufacturing cost is high because the crystal should be processed while controlling the optical axis of the crystal precisely. From this point of view, in the polarization conversion devices described in JP 2008-129190 A and JP 2006-64871 A, a ½ wavelength plate formed of a dielectric multilayer is used. In this case, there are advantages in that not only the thermal resistance is greatly improved but also the manufacturing cost is suppressed to be low.

The ½ wavelength plate used in the polarization conversion devices described in JP 2008-129190 A and JP 2006-64871 A is formed of the dielectric multilayer which is manufactured by the oblique deposition. A retardation film formed of a dielectric multilayer which is manufactured by the oblique deposition may be put into practical use up to a ¼ wavelength plate. However, if the film thickness is increased up to a level at which the retardation film can be used as a ½ wavelength plate, the retardation film becomes clouded. As a result, the transmittance would be reduced. Particularly, a reduction in transmittance at the short wavelength side is noticeable, which would adversely affect the color balance. Also, the dielectric multilayer which is manufactured by the oblique deposition tends to absorb the moisture. As a result, the optical property of the dielectric multilayer would largely change as the dielectric multilayer absorbs the moisture.

SUMMARY OF THE INVENTION

The invention has been made in view of the above circumstances, and has an object to provide a polarization conversion device, which is excellent in thermal resistance and can be manufactured at low cost and realizes a ½ wavelength plate for rotating the polarization direction of linearly polarized light by 90° by a dielectric multilayer which does not require the oblique deposition. Also, the invention also provides a polarized illumination optical device using the polarization conversion device and a liquid crystal projector.

To achieve the above object, according to an aspect of the invention, a polarization conversion device includes a prism sheet and a retardation film. The prism sheet includes a plurality of long-and-narrow rectangular prism elements which are arranged so that edge lines, each of which is formed of a pair of inclined surfaces of the corresponding long-and-narrow rectangular prism element, are parallel to each other and lie in a same plane. The retardation film is formed on each inclined surface so that an optical axis of the retardation film matches a normal line of each inclined surface of the rectangular prism element. The retardation film is formed of a dielectric multilayer which gives a phase difference of a ½ wavelength to light being incident on the prism sheet substantially vertically from a bottom-surface side of the rectangular prism elements and being transmitted through the prism sheet. The rectangular prism elements are arranged so that the edge lines are inclined by about 45° with respect to the polarization direction of the one linearly polarized light beam. Also, according to another aspect of the invention, a polarization conversion device may be implemented by overlapping two polarization conversion elements with each other. In this case, each polarization conversion element is configured by forming, on each inclined surface of the prism sheet, a retardation film which has an optical axis substantially matching a normal line of each inclined surface and which is formed of a dielectric multilayer which gives a phase difference of a ¼ wavelength to light being incident on the prism sheet substantially vertically from a bottom-surface side of the rectangular prism elements and being transmitted through the prism sheet. These polarization conversion elements are arranged so that the edge lines are parallel to each other and are inclined by about 45° with respect to the polarization direction of the one linearly polarized light beam.

The retardation film formed of the dielectric multilayer is designed based on a center wavelength which is set in advance. When a target wavelength band expands, the retardation film generally shows a tendency that a polarization conversion efficiency decreases as a wavelength gets away from the center wavelength. However, where the configuration that two polarization conversion elements are overlapped with each other is adopted, the edge lines of the respective polarization conversion elements may be arranged by different angles with respect to the polarization direction of the linearly polarized light. For example, like a visible light band, where a high conversion efficiency is required in a wide wavelength band of 440 nm to 650 nm while the retardation film is designed with the center wavelength of near about 550 nm, one of the polarization conversion elements may be arranged so that its edge lines are inclined by an angle θ1 with respect to the polarization direction of the one linearly polarized light, and the other polarization conversion element may be arranged so that its edge lines are inclined by an angle θ2 with respect to the polarization direction of the one linearly polarized light, and the relationship of $2\times(\theta 1-\theta 2)\approx 90°$ may be satisfied. Furthermore, where θ1 and θ2 are set in ranges of $60°\leq \theta 1\leq 70°$ and $15°\leq \theta 2\leq 25°$, a high conversion efficiency can be achieved over the entire visible light By combining the above polarization conversion element and a polarized beam splitter that includes a polarizing split layer on a bonding surface between prisms, that transmits one of first and second linearly polarized light beams whose polarization directions are perpendicular to each other, out of non-polarized light beams incident on the polarizing split layer, and that reflects the other of the first and second linearly polarized light beams, a polarized illumination optical device that converts the non-polarized light beams from an illumination light source into linearly polarized light in which polarization directions are aligned in one direction can be achieved. Furthermore, when the plurality of polarized beam splitters are arranged so that the edge lines of the rectangular prism elements are parallel to each other and lie in the same plane, the polarized illumination optical device can be effectively used in an illumination optical system of a liquid crystal projector.

Particularly, In a liquid crystal projector including an illumination optical system that divides illumination light from a light source lamp using a pair of microlens arrays, in which a plurality of microlenses is arranged and that emits the divided illumination light beams so as to be superimposed on a liquid crystal display panel, the respective divided light fluxes become finite fluxes having divergence angles of 5° to 6° at most in peripheral portions. Therefore, the above polarized illumination optical device may be disposed just after an emission surface of the pair of microlens arrays.

With the above configurations, it is possible to obtain a polarization conversion device which is excellent in thermal resistance and can be manufactured at low cost. Moreover, when either one of the first and second linearly polarized light beams whose polarization directions are perpendicular to each other is incident on the polarization conversion device, the one linearly polarized light can be efficiently converted into the other linearly polarized light beam. The retardation film used in the polarization conversion device can be manufactured using a normal deposition method of performing deposition from a direction substantially perpendicular to the substrate surface. Accordingly, it is possible to obtain a retardation film which has no cloudy part, which is easily generated by the oblique deposition, and which is also excellent in physical durability. Also, by using the above polarization conversion device as a polarization conversion device provided in an illumination optical system of a liquid crystal projector, linearly polarized light for illumination of a liquid crystal display panel can be obtained with high efficiency. As a result, it becomes possible to improve the contrast of a projected image.

DETAILED DESCRIPTION OF EMBODIMENT OF THE INVENTION

Figure 1:
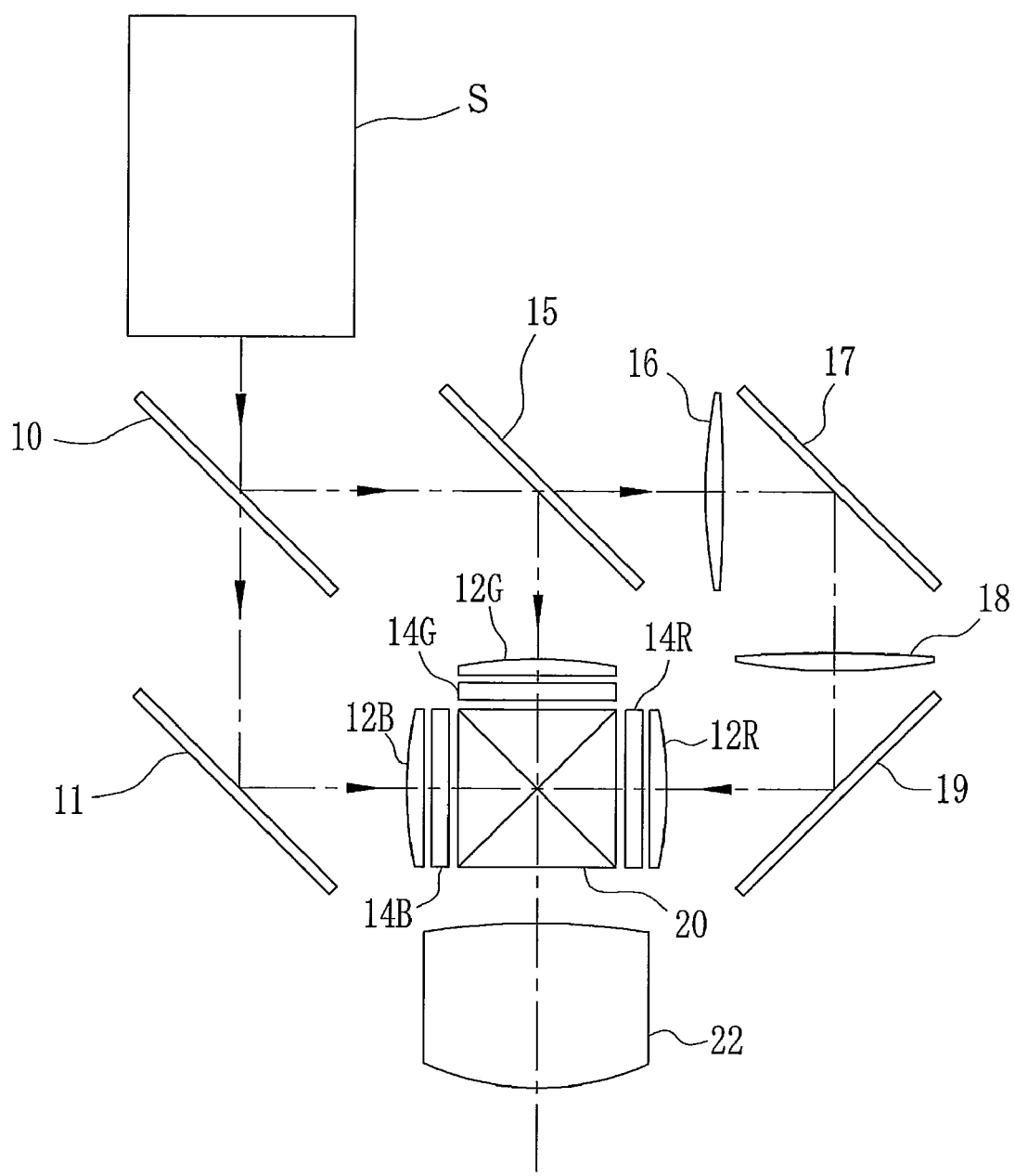
FIG. 1 is a schematic view showing main parts of an illumination optical system of a liquid crystal projector.
Figure 2:
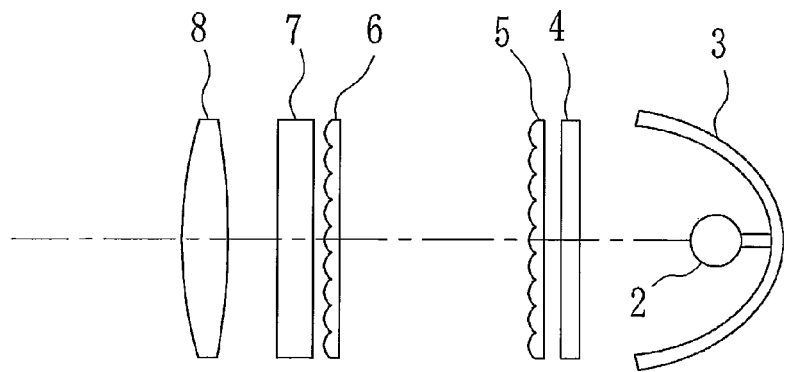
FIG. 2 is a schematic view showing main parts of a light source device of the liquid crystal projector.

An optical system of a liquid crystal projector is schematically configured as shown in FIG. 1 including a light source device S. As shown in FIG. 2, the light source device S includes a high-intensity light source lamp 2, such as an ultrahigh-pressure mercury lamp, and the light source lamp 2 is used together with a reflector 3. A filter 4 for cutting infrared light and ultraviolet light is provided on an illumination optical path. Non-polarized illumination light beams in a visible range in which various polarized light beams are mixed are incident on a first microlens array 5 as substantially parallel beams. The first microlens array 5 is obtained by arranging plural microlenses in a rectangular matrix so as to follow the rectangular shape of a liquid crystal display panel, and forms a pseudo light source corresponding to the number of microlenses equivalently on a second microlens array 6 having the same structure.

The illumination light emitted from the pseudo light source formed on the second microlens array 6 is incident on a polarized illumination optical device 7 at an incidence angle of about 5° to 6° even in the case of ambient light. The polarized illumination optical device 7 serves to separate linearly polarized light, which has a polarization direction perpendicular to the plane of the drawing paper, from the non-polarized illumination light including various polarized light beams and to make the separated linearly polarized light be incident on an illumination lens 8. The illumination lens 8 guides illumination light beams, which are emitted as linearly polarized light from the polarized illumination optical device 7 for the respective pseudo light sources, to the overall effective screens of liquid crystal display panels which are provided in a B (blue light) channel, a G (green light) channel, and an R (red light) channel for overlap, thereby uniformly illuminating the liquid crystal display panel of each channel.

The illumination light emitted from the light source device S through the illumination lens 8 is first incident on a dichroic mirror 10, as shown in FIG. 1. The dichroic mirror 10 transmits blue light and reflects the other color light beams. The blue light is incident on a field lens 12B through a total reflection mirror 11. The light beams from the pseudo light source overlap on the field lens 12B by an operation of the illumination lens 8 and uniformly illuminate the inside of the effective area of a liquid crystal display panel 14B provided behind the field lens 12B. Also, a green light beam of the color light beams reflected by the dichroic mirror 10 is reflected by the next dichroic mirror 15, and uniformly illuminates a liquid crystal display panel 14G through a field lens 12G in the same manner as described above.

A red light beam transmitted through the dichroic mirror 15 is guided to a field lens 12R through a first relay lens 16, a total reflection mirror 17, a second relay lens 18, and a total reflection mirror 19 and uniformly illuminates a liquid crystal display panel 14R from the back surface side in the same manner as described above. Since the length of the illumination optical path of the R channel is larger than those of the B and G channels, the operation of the illumination lens 8 is deteriorated in the R channel. However, the operation of the illumination lens 8 is similarly realized even in the R channel by using the first and second relay lenses 16 and 18.

By the field lenses 12B, 12G, and 12R, the liquid crystal display panels 14B, 14G, and 14R are uniformly illuminated by the linearly polarized illumination light from the back surface side without the peripheral brightness being reduced. Then, image light beams for respective channels transmitted through the liquid crystal display panels 14B, 14G, and 14R are mixed by a cross dichroic prism 20, are incident on a projector lens 22 as full-color image light, and are projected toward a screen.

Figure 3:
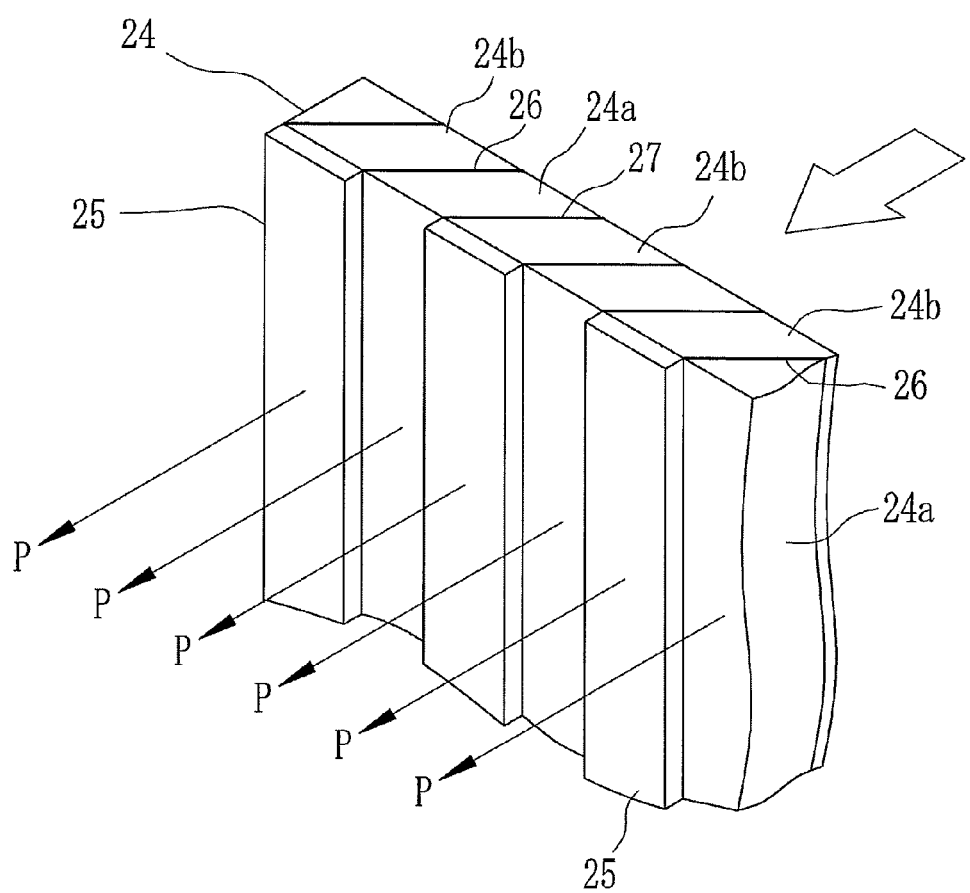
FIG. 3 is a view showing an outer appearance of a polarized illumination optical device.

The polarized illumination optical device 7 used in the light source device S has an outer appearance of a substantially rectangular plate shape as shown in FIG. 3. The polarized illumination optical device 7 is configured to include a polarized beam splitter array 24 and polarization conversion devices 25 which are bonded to a light emission surface side of the polarized beam splitter array 24 at predetermined intervals. The polarized beam splitter array 24 is formed by bonding a plurality of vertically elongated prism rods 24a and 24b having a parallelogram shape in section. On the bonding surfaces of the prism rods 24a and 24b, a polarizing split layer 26 formed of a dielectric multilayer and a reflection layer 27 formed of a metallic layer are alternately formed. The prism rods 24a and 24b have the same shape and are shaped so that the polarizing split layers 26 and the reflection layers 27 have an inclination of 45° with respect to the normal line of the incidence surface.

Among non-polarized illumination light beams which are incident almost vertically on the incidence surface (back surface side in the drawing) of the prism rod 24b, the polarizing split layer 26 transmits linearly polarized light (having a polarization direction parallel to a plane including an incident light beam and the normal line of the polarizing split layer 26) of P-polarized light component and reflects linearly polarized light (having a polarization direction perpendicular to the polarization direction of the linearly polarized light of the P-polarized light component) of S-polarized light component. The P-polarized light transmitted through the polarizing split layer 26 is emitted from the emission surface side through the prism rod 24a, while the S-polarized light reflected by the polarizing split layer 26 is reflected by the reflection layer 27 and is then incident vertically on the polarization conversion device 25. Also, a light shielding layer or a reflection layer is formed on the incidence surface side of the other prism rod 24a so that non-polarized light from the light source lamp 2 is not incident on the prism rod 24a.

The polarization conversion device 25 has a function of a ½ wavelength plate which rotates the polarization direction of the linearly polarized light, which is vertically incident, by 90° and emits the light. Accordingly, the S-polarized light is converted into the P-polarized light while being transmitted through the polarization conversion device 25 and is then emitted from the emission surface side. By arranging the pair of prism rods 24a and 24b including the polarizing split layer 26 and the reflection layer 27 alternately and in parallel, the polarized illumination optical device 7 having the plate shape shown in the figure can be obtained. The polarized illumination optical device 7 may be disposed immediately after the emission surface of the second microlens array 6 shown in FIG. 2 so as to cover the entire emission surface.

Figure 4:
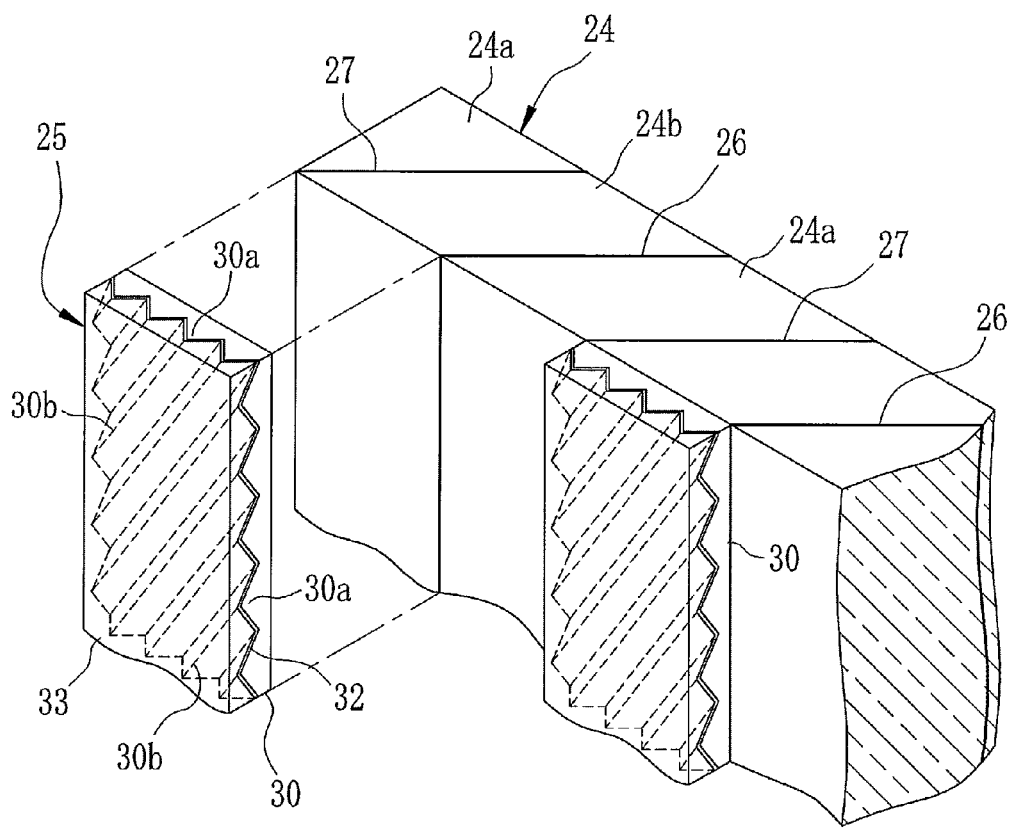
FIG. 4 is a partially broken perspective view showing the structure of the polarized illumination optical device.

Referring to FIG. 4 which shows the structure of the polarized illumination optical device 7, the polarization conversion device 25 is formed in a vertically long rectangular shape so as to cover the entire emission surface of the prism rod 24b. In this case, a prism sheet 30, in which a plurality of long and narrow rectangular prism elements 30a are arranged so that edge lines 30b of the rectangular prism elements 30a are parallel to each other and lie in the same plane, is used as a base. Such a prism sheet 30 may be manufactured with transparent plastics or glass. Moreover, the bottom-surface side of the rectangular prism element 30a in the polarization conversion device 25 is bonded to the emission surface of the prism rod 24b so that the edge lines 30b of the rectangular prism elements 30a keep inclined by 45° with respect to the polarization direction (vertical direction) of the linearly polarized light of the S-polarized light component.

Figure 5:
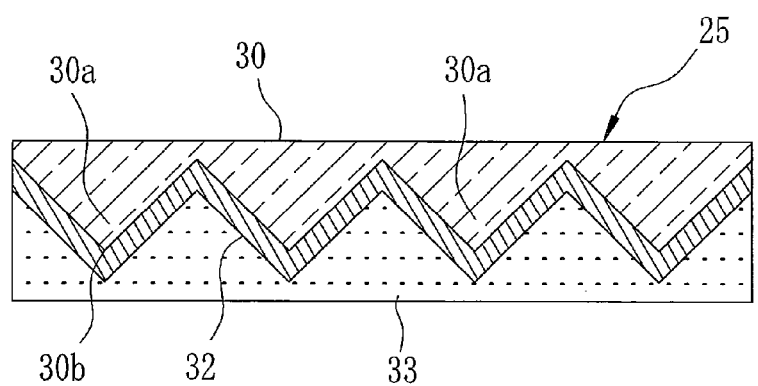
FIG. 5 is a schematic section view of a polarization conversion device.

As shown in FIG. 5, a retardation film 32 which has optical anisotropy is formed so as to cover the entire inclined surface of the prism sheet 30 uniformly. The retardation film 32 may be manufactured by alternately laminating two kinds of thin dielectric layers having different refractive indices up to about 140 layers, for example. In this case, the optical thickness of each thin dielectric layer is sufficiently thin, and is equal to or smaller than 1/(ten and several) of $\lambda/4$ or $\lambda/2$ which is frequently used in a so-called optical interference thin layer. It is known that the value of birefringence $\Delta n$ for the optical anisotropy is determined based on (i) a difference between refractive indices of the two kinds of thin dielectric layers laminated and (ii) the film thickness ratio thereof. The retardation is determined based on a product of physical film thickness d and birefringence Δn of the entire dielectric multilayer.

In manufacturing of the retardation film 32, the prism sheet 30 may be set in a vapor deposition apparatus so that one surface side of the prism sheet 30 on which the edge lines 30b are arranged faces two kinds of vapor deposition sources, and two kinds of thin dielectric layers having different refractive indices are stacked by alternately performing the deposition using the deposition sources. A depth from the edge line 30b of the rectangular prism element 30a to a valley thereof is about 1 mm at most. Taking into consideration that a distance from the deposition source is 1 m or more, the distance difference from each edge line 30b of the rectangular prism element 30a to the corresponding valley thereof does not matter in such normal deposition. Accordingly, on the inclined surfaces of the rectangular prism elements 30a, the two kinds of thin dielectric layers are sequentially stacked in the normal direction thereof.

The retardation film 32 formed on the inclined surface of the rectangular prism element 30a as described above serves as a uniaxial negative C plate whose optical axis matches the normal line of each inclined surface. Also, by adjusting the total film thickness d on the value of the birefringence Δn set in advance and the optical path length in the retardation film 32, the phase difference of ½ wavelength can be given to a light beam which is incident substantially vertically from the bottom surface of the prism sheet 30 and is transmitted through the retardation film 32. Also, an overcoat layer 33 is provided on the surface of the retardation film 32 by applying polysilazane by the spin coating so that the total reflection of light beams transmitted through the retardation film 32 does not occur on the inner surface thereof. By providing the overcoat layer 33, the surface of the retardation film 32 is made smooth. Although an organic solvent is used when polysilazane is applied by the spin coating, the organic solvent volatilizes by drying and the overcoat layer 33 itself becomes an inorganic material. Moreover, as deposition materials used in the retardation film 32, known materials may be used. For example, $TiO_2$, $ZrO_2$, $Ta_2O_5$, and $Nb_2O_5$, may be used as high refraction materials, and $SiO_2$, $MgF_2$, and $CaF_2$ may be used as low refraction materials. The overcoat layer 33 may also be formed by deposition.

Figure 6A:
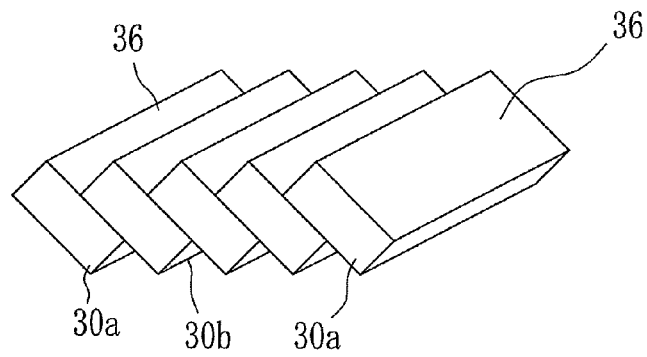
FIGS. 6A to 6C are explanatory views showing an example of a manufacturing process of the polarization conversion device.
Figure 6B:
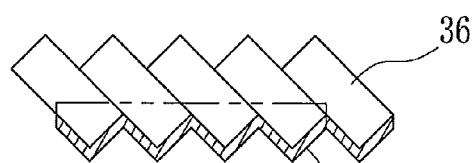
Figure 6C:
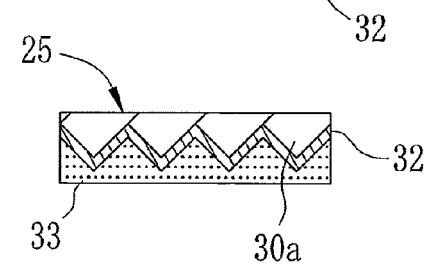

An example of a manufacturing method of the polarization conversion device 25 including the manufacture of the prism sheet 30 is shown in FIGS. 6A to 6C. As shown in FIG. 6A, optical glass plates 36 having a thickness of 1 mm are inclined by 45° and are bonded to each other so that the rectangular prism elements 30a are located on the bottom-surface side. Then, as shown in FIG. 6B, the retardation film 32 is deposited on the surface on which the rectangular prism elements 30a are arranged. After the deposition, the optical glass plates 36 are cut along a cut line shown by a two-dot chain line, and the cut surfaces are polished. Then, the overcoat layer 33 is applied by the spin coating onto the retardation film 32, and the surface thereof is made smooth, thereby obtaining the polarization conversion device 25. Also, an adhesive having the substantially same refractive index as the optical glass plate 36 is used on the bonding surfaces between the optical glass plates 36. Accordingly, all of them can be regarded as substantially the integrated prism sheet 30.

The operation of the polarized illumination optical device 7 configured as described above will be described below. Non-polarized illumination light, which is emitted from each of the microlenses that form the second microlens array 6 so that main beams are substantially parallel to each other, is incident on the polarized illumination optical device 7 for every microlens. As shown in FIG. 3, the illumination light, which is emitted from the microlens and is then incident substantially vertically on the incidence surface of the prism rod 24b, is incident on the polarizing split layer 26 at an incident angle of 45°.

The polarizing split layer 26 transmits linearly polarized light of the P-polarized light component among the incident illumination light, and reflects linearly polarized light of the S-polarized light component by 45°. The transmitted linearly polarized light of the P-polarized light component is emitted as the linearly polarized light of the P-polarized light component from the emission surface of the prism rod 24b. The linearly polarized light of the S-polarized light component reflected by the polarizing split layer 26 is incident substantially vertically on the polarization conversion device 25 bonded to the emission surface of the prism rod 24b.

Since the retardation film 32 used in the polarization conversion device 25 is formed of the dielectric multilayer, which is laminated in the normal direction of each inclined surface of the rectangular prism element 30a, the optical axis of the retardation film 32 matches the normal direction of each inclined surface. However, since the edge line 30b of each rectangular prism element 30a is inclined by 45° with respect to the polarization direction of the S-polarized light, the optical axis which matches the normal line of each inclined surface is also inclined by ±45° with respect to the polarization direction of the S-polarized light. Accordingly, the linearly polarized light of the S-polarized light component is incident on the retardation film 32 in a state where it is equivalently inclined by 45°. For this reason, by adjusting the thickness of the retardation film 32 in consideration of the oblique incidence, the polarization direction (plane of polarization) of the linearly polarized light of the S-polarized light component is rotated by 90° while the linearly polarized light of the S-polarized light component is being transmitted through the retardation film 32, and is then emitted from the polarization conversion device 25 as linearly polarized light of the P-polarized light component.

As described above, when illumination light from the light source lamp 2 is incident on the polarized illumination optical device 7, only the linearly polarized light of the P-polarized light component, whose polarization direction is aligned in the horizontal direction, among various polarized light beams is emitted and can be used for illumination of the liquid crystal display panels 14B, 14G, and 14R provided for the respective color channels. As is known well, since a high-intensity lamp is used as the light source lamp 2, its vicinity reaches considerable temperatures. However, the retardation film 32 used in the polarized illumination optical device 7 is formed of an inorganic material, can be manufactured as a layer which does not require the oblique deposition and in which the thickness of the respective thin dielectric layers can be easily monitored. Accordingly, there are advantages that the durability is excellent and that the cost can be reduced by mass production.

Figure 7:
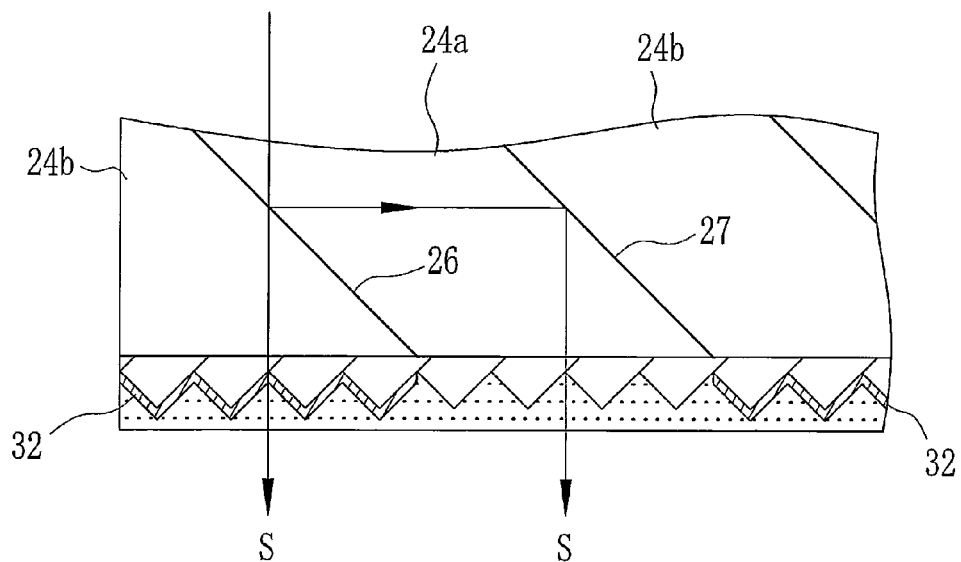
FIG. 7 is a section view showing main parts of a polarized illumination optical device according to another embodiment.

In an embodiment shown in FIG. 7, the P-polarized light transmitted through the polarizing split layer 26 is converted into the S-polarized light by the retardation film 32, and the S-polarized light reflected by the polarizing split layer 26 is reflected by the reflection layer 27 and is then emitted. Thus, the desired one of the P-polarized light and the S-polarized light can be extracted depending on where the retardation film 32 is used on the emission surface of the polarized beam splitter array 24.

Also, in this embodiment, the continuous prism sheet 30 is bonded to the entire emission surface of the polarized beam splitter array 24. However, when the retardation film 32 is deposited on the rectangular prism element 30*a* of the prism sheet 30, the retardation film 32 is not formed in a region bonded to the emission surface of the prism rod 24*a* by the masking technique or the like. Using this technique, it is possible to save the time and effort for separately bonding the polarization conversion device 25 to each emission surface of the prism rods 24*a* and 24*b* while performing the positioning.

Figure 8A:
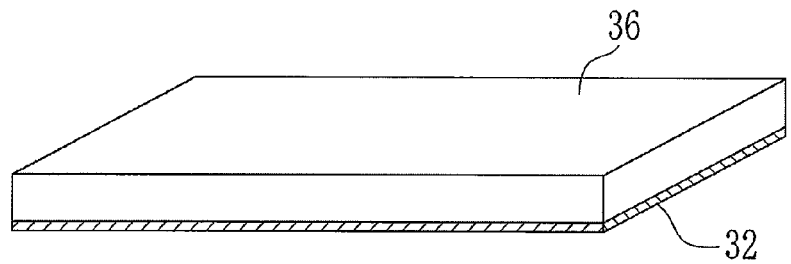
FIGS. 8A to 8E are explanatory views showing another example of the manufacturing process of the polarization conversion device.
Figure 8B:
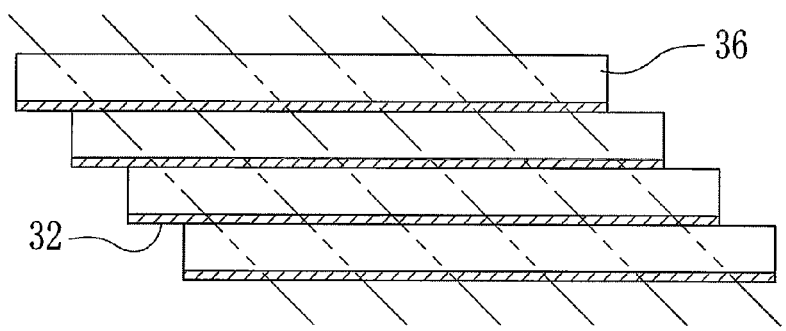
Figure 8C:
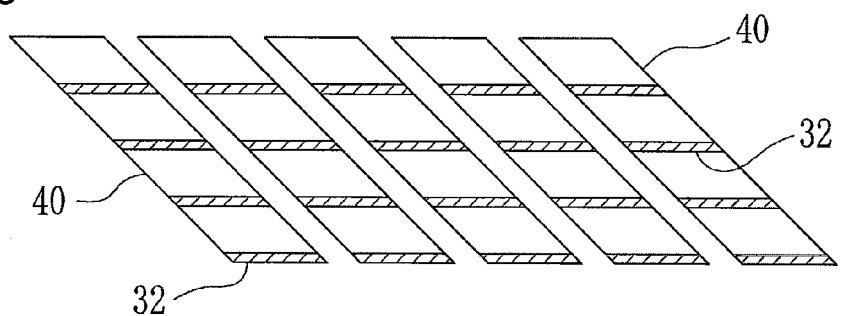

FIGS. 8A to 8E show another method of manufacturing the polarization conversion device 25. In this manufacturing method, the retardation film 32 is deposited on one surface of the optical glass plate 36, as shown in FIG. 8A. The optical glass plates 36 on which the retardation films 32 are deposited are bonded to each other in a state where they are shifted from each other with predetermined pitches therebetween as shown in FIG. 8B, and are then cut along cut lines shown by the two-dot chain lines in the figure, and the cut surfaces are polished. As a result, as shown in FIG. 8C, trapezoidal prism rods 40 each of which has the retardation films 32 inside with predetermined pitches therebetween are obtained.

Figure 8D:
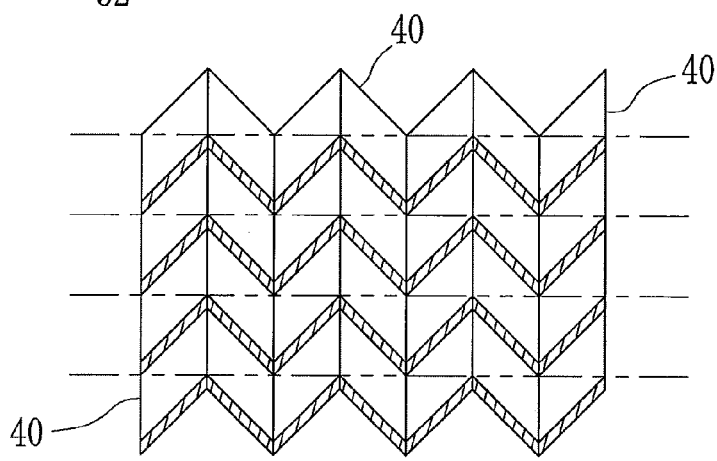
Figure 8E:
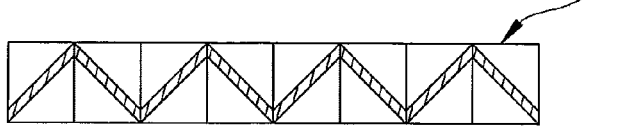

Then, as shown in FIG. 8D, the prism rods 40 are bonded to each other in the longitudinal direction. In this case, the directions of the prism rods 40 are alternately switched so that the retardation films 32 form a V shape. After the bonding process, as shown in FIG. 8E, the polarization conversion device 25 having a shape shown in FIG. 8E is obtained by horizontally cutting the prism rods 40 along cut lines shown by two-dot chain lines as shown in FIG. 8D. In the polarization conversion device 25 manufactured as described above, the retardation film 32 does not appear on the surface. Accordingly, since total reflection of light beams transmitted through the retardation film 32 does not occur on the interface with air, the overcoat layer 33 described above is not required. Also, since there are the cutting process and the polishing process in FIGS. 8B and 8D, it is necessary to adjust the size in consideration of cut part or polished part.

Figure 9:
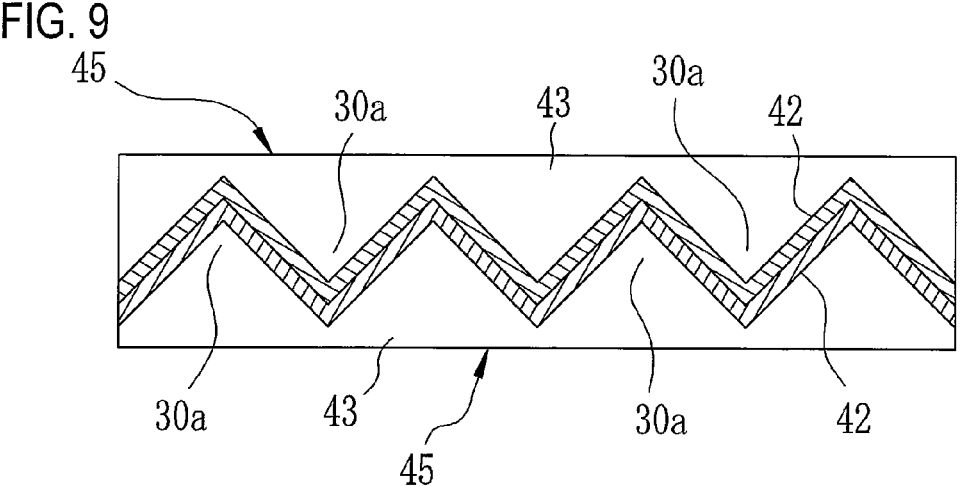
FIG. 9 is a schematic section view showing another example of the polarization conversion device.

In the embodiment described above, the retardation film 32 has a function of the ½ wavelength plate. However, as shown in FIG. 9, two polarization conversion elements 45, in each of which a retardation film 42 serving as a ¼ wavelength plate is formed on the inclined surface of the rectangular prism element 30*a* of a prism sheet 43, may be bonded to each other. This may be used as one polarization conversion device 25 which functions as the ½ wavelength plate. Of course, only one of the polarization conversion elements 45 may be used as the ¼ wavelength plate in various applications. In this case, there are advantages that the retardation film 42 is formed of an inorganic material and can be manufactured simply and at low cost since the oblique deposition is not required.

Figure 10A:
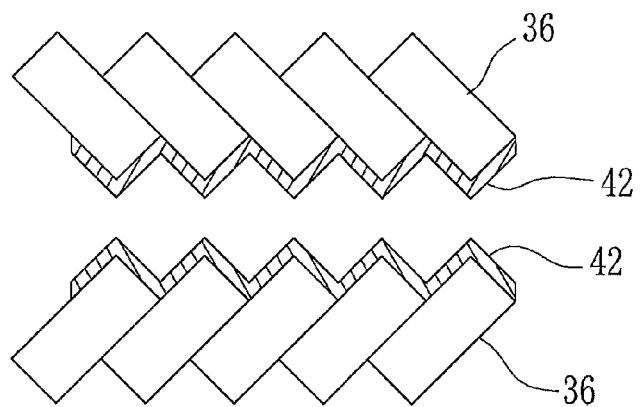
FIGS. 10A to 10C are explanatory views showing a manufacturing process of the polarization conversion device shown in FIG. 9.
Figure 10B:
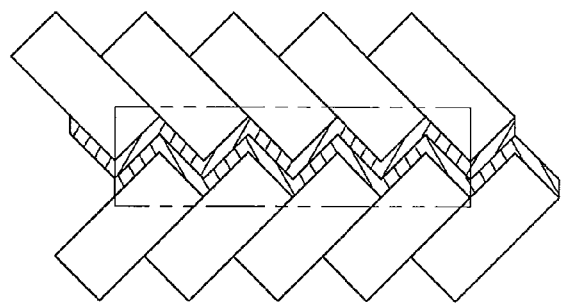
Figure 10C:
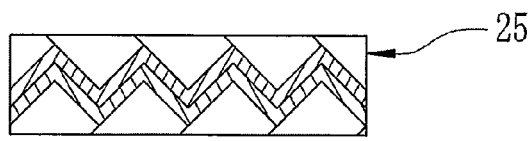

The polarization conversion device 25 shown in FIG. 9 can be simply manufactured by using a method shown in FIGS. 10A to 10C, for example. That is, during the manufacturing process, which has been described with reference to FIG. 6B, the retardation film 42 which gives a phase difference of a ¼ wavelength is deposited instead of the retardation film 32 which gives the phase difference of the ½ wavelength, and the pair of optical glass plates 36 are bonded to each other so that the inclined surfaces of the rectangular prism elements 30*a* come in contact with each other. Then, by cutting and polishing it along cut lines shown by two-dot chain lines in FIG. 10B, the polarization conversion device 25 shown in FIG. 10C is obtained.

Figure 11A:
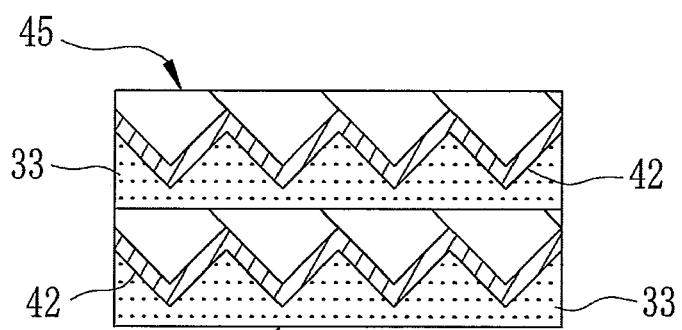
FIGS. 11A and 11B are schematic section views showing still other examples of the polarization conversion device.
Figure 11B:
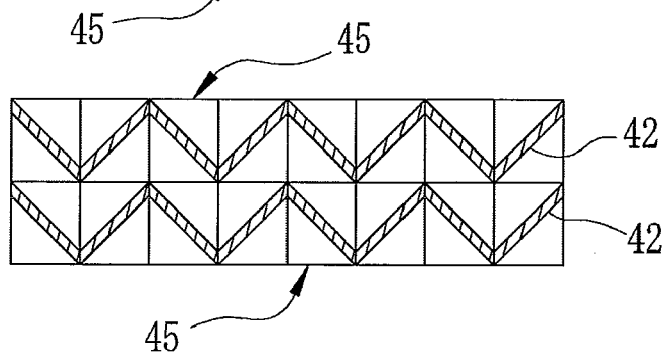

In embodiments shown in FIGS. 11A and 11B, other examples of the polarization conversion device 25, which functions as a ½ wavelength plate by combining the two polarization conversion elements 45 functioning as the ¼ wavelength plates, are shown. FIG. 11A shows an example in which flat surfaces of the pair of polarization conversion elements 45 having the retardation films 42 instead of the retardation films 32 shown in FIG. 6C are bonded to each other. Also, FIG. 11B shows an example in which the pair of polarization conversion devices 45 having the retardation films 42 instead of the retardation films 32 shown in FIG. 8E are bonded to each other. Thus, even if the retardation films 42 are not in contact with each other, the function as the ½ wavelength plate can be obtained in a completely similarly so long as the retardation films 42 overlap each other in a light transmission region.

Figure 12:
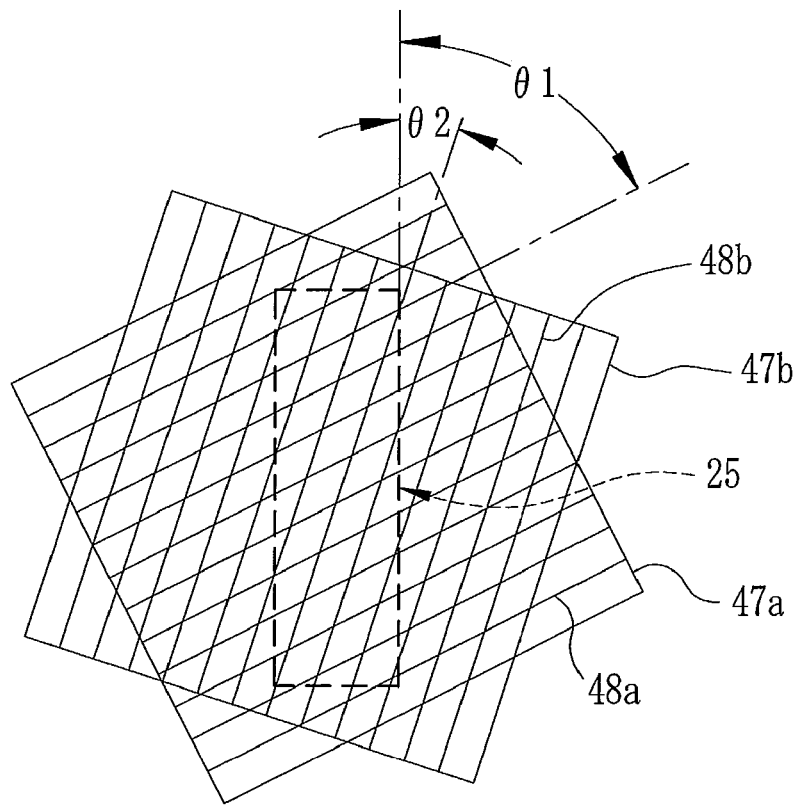
FIG. 12 is an explanatory view showing a state where edge lines of a prism sheet are inclined.

In the polarization conversion devices 25 shown in FIGS. 11A and 11B, the flat surfaces are in contact with each other without the rectangular prism elements being in close contact with each other. Therefore, the polarization conversion devices 25 can be used in a state where the edge lines of the rectangular prism elements cross each other. FIG. 12 shows this situation. In FIG. 12, two prism sheets 47*a* and 47*b*, in each of which the retardation film 42 for giving a phase difference of a ¼ wavelength is formed on the inclined surface of the rectangular prism element, are bonded to each other so that edge lines 48*a* and 48*b* of the rectangular prism elements cross each other. In this bonding, the edge line 48*a* of one prism sheet 47*a* is inclined by an angle θ1 with respect to a vertical line, and the edge line 48*b* of the other prism sheet 47*b* is inclined by an angle θ2 with respect to the vertical line. Then, it is cut by a cut line shown as a broken line, thereby obtaining the polarization conversion device 25 having a strip shape.

Figure 13:
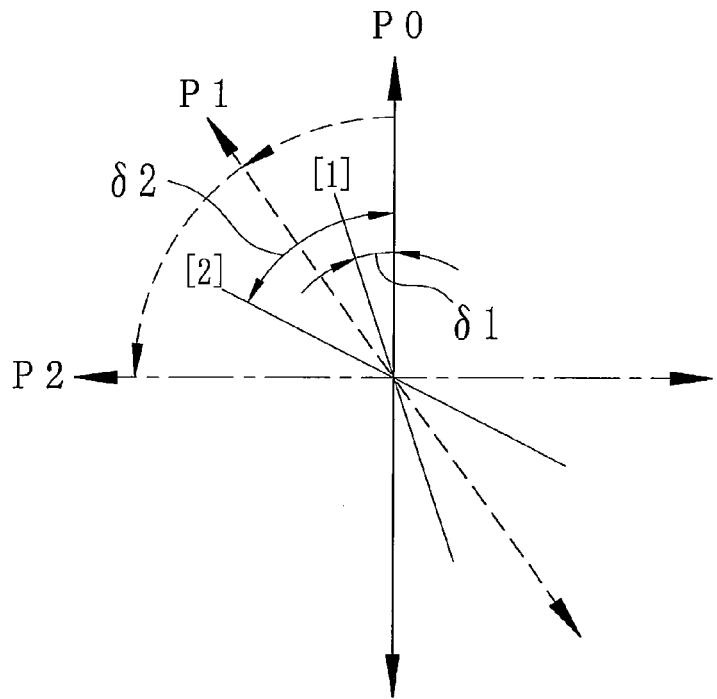
FIG. 13 is an explanatory view of an operation when the edge lines are inclined.

It is assumed that linearly polarized light of P-polarized light component whose polarization direction matches the vertical direction is incident on the polarization conversion device 25. In this case, an optical axis [1] of the retardation film 42 formed on the one prism sheet 47*a* is perpendicular to the edge line 48*a*. Therefore, as shown in FIG. 13, the optical axis [1] is inclined by an angle δ1 (=90°−θ1) counterclockwise from the polarization direction PO of the linearly polarized incident light. Accordingly, the linearly polarized light which has been incident in the polarization direction PO is converted into linearly polarized light having the polarization direction P1 which is inclined by 2δ1 in the counterclockwise direction. Also, an optical axis [2] of the retardation film 42 of the other prism sheet 47*b* whose edge line 48*b* is inclined by an angle θ2 from the vertical direction is similarly inclined by an angle δ2 (=90°−θ2) from the polarization direction PO. Accordingly, the polarization direction P1 of the linearly polarized light is further inclined by an angle 2(δ2−2δ1) to become linearly polarized light of a polarization direction P2. Accordingly, by determining the values of the angles θ1 and θ2 so that the value of 2δ1+2(δ2−2δ1), that is, the value of 2(θ1−θ2) becomes equal to 90°, the linearly polarized light of the P-polarized light component having a vertical polarization direction is converted into the linearly polarized light of S-polarized light component having a horizontal polarization direction.

Also, since a pair of inclined surfaces which form the rectangular prism element 30 are at right angles to each other, the optical axes of the retardation films 42 formed on the respective inclined surfaces also at right angles to each other. Accordingly, when the rotation of the polarization direction on one inclined surface is as shown in FIG. 12, the retardation film 42 formed on the other inclined surface serves to rotate the linearly polarized light P0 shown in FIG. 13 at the same angle in the clockwise direction. Therefore, by determining the values of the angles θ1 and θ2 so that the relationship of θ1−θ2=45° is met, the polarization conversion device 25 obtained by combining the pair of polarization conversion devices 45 can also be used as the ½ wavelength plate. Also, when the polarization conversion device 25 is used as the ½ wavelength plate, one or both of θ1 and θ2 may be replaced by θ1±n×90° and θ2±n×90°.

Figure 14:
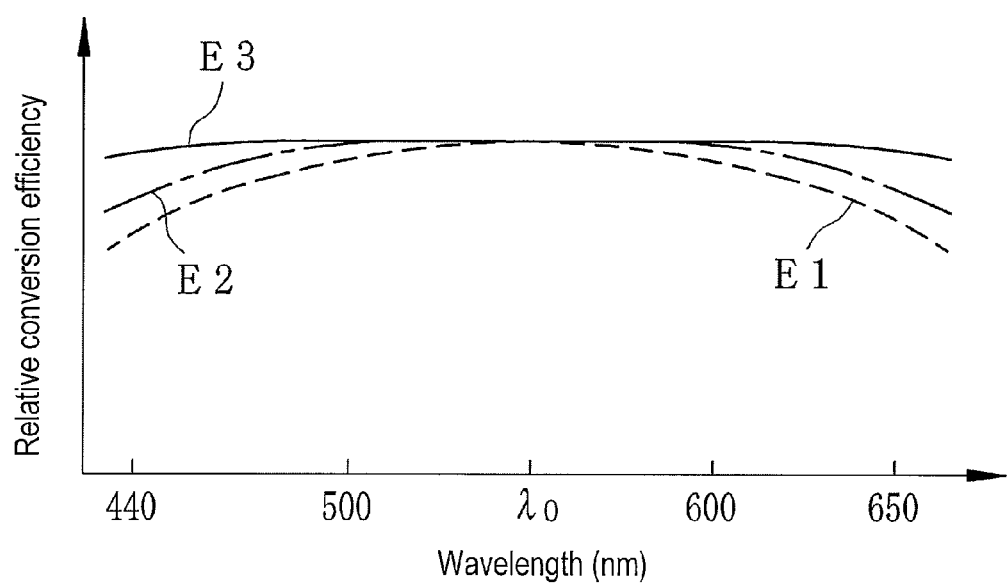
FIG. 14 is a graph showing a tendency of a spectrum conversion efficiency characteristic of the polarization conversion device.

In the case where the polarization conversion devices 45 are combined and used as described above, there are the following advantages as compared with the above-described embodiment in which the edge lines of the rectangular prism elements 30 are inclined by 45°. A relative conversion efficiency characteristic E1 shown by a broken line in FIG. 14 expresses a spectral characteristic when the pair of polarization conversion devices 25 is used in a state where they are inclined by 45° as shown in FIG. 4, for example. In this case, the satisfactory conversion efficiency is shown near the designed center wavelength $\lambda_0$ of the retardation film 32, but the conversion efficiency is reduced as the wavelength becomes distant from the center wavelength $\lambda_0$. On the other hand, a characteristic E2 is obtained in the polarization conversion device in which the two polarization conversion elements 45 are used in a state where the angles of θ1=55° and θ2=10° are set. A characteristic E3 is obtained in the polarization conversion device in which the two polarization conversion elements 45 are used in a state where the angles of θ1=63° and θ2=18° are set. Accordingly, it is confirmed that the wavelength characteristic is improved. Although various values may be set as the values of θ1 and θ2; it can be estimated that the range of $60° \leq θ1 \leq 70°$ and $15° \leq θ2 \leq 25°$ are preferable taking symmetry of the spectral characteristic into consideration.

Figure 15:
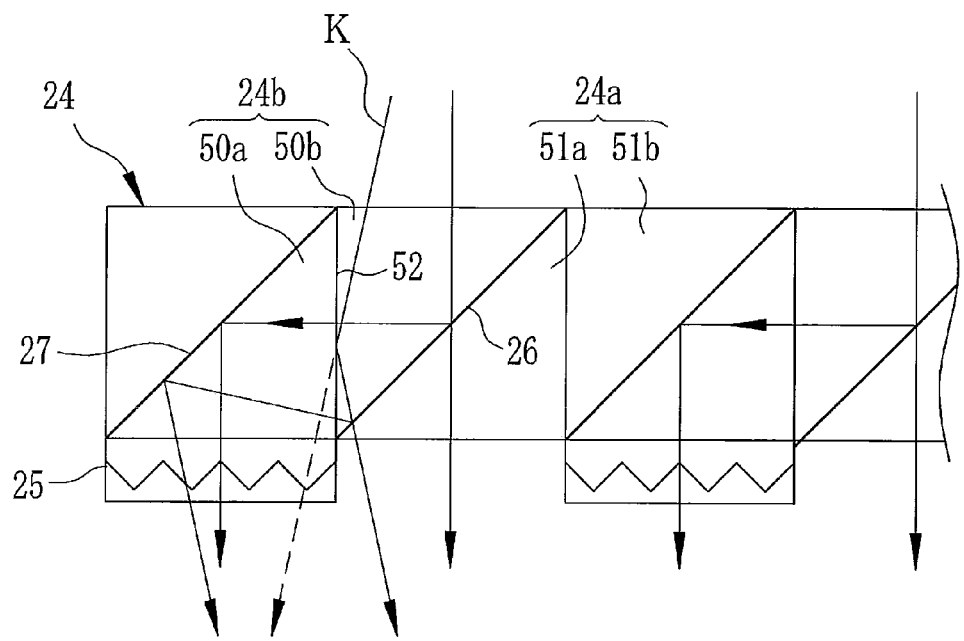
FIG. 15 is a schematic view showing another example of a polarized beam splitter array.

On the other hand, in the polarized beam splitter array 24 shown in FIG. 3 or 4, the prism rod 24b may s formed by combining columnar rectangular prisms 50a and 50b, and the prism rod 24a may formed by combining similar rectangular prisms 51a and 51b as shown in FIG. 15. Also, the polarization conversion device 25, the polarizing split layer 26, and the reflection layer 27 which have the same functions as those described above are denoted by the same reference numerals.

When the polarized beam splitter array 24 having this structure is used, it is also effective to form an angle selection layer 52 on the bonding surface between the rectangular prisms 50a and 50b. For example, the angle selection layer 52 is formed of an $SiO_2$ layer, which has a refractive index of 1.46 and a thickness of about 500 nm. When light beams in a visible light wavelength range are incident at small incident angles of 0° to 10°, the angle selection layer 52 serves to transmit almost 100% of the light beams. On the contrary, when the light beams are incident at large incident angles of 80° to 90°, the angle selection layer 52 serves to reflect almost 100% of the light beams.

As described above, in the illumination optical system using the microlens array, there is also a light beam which is incident on the polarized beam splitter array 24 at the angle of divergence of 5 to 6°. Since such light beams K are incident on the angle selection layer 52 at large angles, most of the light beams K are reflected to be incident on the polarizing split layer 26 as shown by a solid line in FIG. 15. Then, the light beams K are divided into linearly polarized light of P-polarized light component, which is transmitted through the polarizing split layer 26, and linearly polarized light of S-polarized light component, which is reflected by the polarizing split layer 26. Since the reflected linearly polarized light of the S-polarized light component has a small incidence angle, the reflected linearly polarized light of the S-polarized light component is transmitted through the angle selection layer 52 and is then reflected by the reflection layer 27. The polarization direction of the reflected linearly polarized light of the S-polarized light component rotates by 90° while being transmitted through the polarization conversion device 25. As a result, the reflected linearly polarized light of the S-polarized light component is converted into linearly polarized light of the P-polarized light component. Accordingly, it is possible to prevent the non-polarized light beams K from being transmitted and emitted through the polarization conversion device 25 as shown by a broken line in FIG. 15. As a result, it is possible to reduce noise light.

Figure 16:
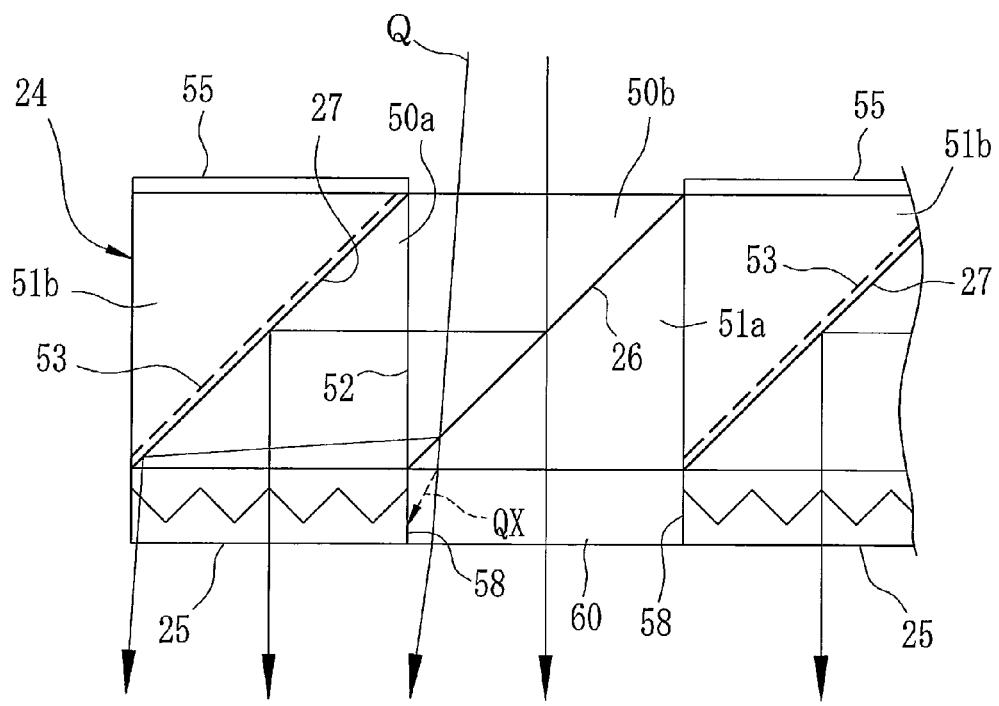
FIG. 16 is a schematic view showing still another example of the polarized beam splitter array.

In an embodiment shown in FIG. 16, a glass plate 60 serving as an optical guide is bonded to the emission surface of the columnar rectangular prism 51a. In the case where the glass plate 60 is not provided, the linearly polarized light of the P-polarized light component, which has been transmitted through the polarizing split layer 26, among obliquely incident light beams Q is emitted as refracted light QX shown by a broken line from the emission surface of the rectangular prism 51a and is then eclipsed on the side surface of the adjacent polarization conversion device 25. This is disadvantageous in using the linearly polarized light of the P-polarized light component effectively.

For this reason, if the glass plate 60 having the same refractive index as the rectangular prism 51a is bonded to the emission surface, the linearly polarized light transmitted through the polarizing split layer 26 is guided up to a surface of the glass plate 60 without being refracted at the emission surface. Accordingly, the eclipse does not occur on the side surface of the adjacent polarization conversion device 25. Also, since the surface of the glass plate 60 becomes an interface being in contact with air, it is desirable to form an anti-reflection layer thereon. Moreover, by forming a selective reflection layer 58, which reflects a light beam being incident at a large incident angle, on the side surface of the glass plate 60 like the angle selection layer 52 described above, the use efficiency can be further improved.

Also, an absorption layer 53 may be formed behind the reflection layer 27, which reflects the linearly polarized light of the S-polarized light component being reflected by the polarizing split layer 26, toward the polarization conversion device 25 so that a small amount of light transmitted through the reflection layer 27 or a small amount of light transmitted through the reflection layer or a light shielding layer 55 formed on the incidence surface side of the rectangular prism 51b. This is more effective in increasing the contrast of an image projected by a liquid crystal projector.

Accordingly, explanations based on the embodiments shown in the figures have been given. The polarization conversion device of the embodiments of the invention may be appropriately used in a polarized illumination optical device of a liquid crystal projector. In a field related to the polarization, however, it may be required to rotate by 90° the polarization direction of light from various light sources including a laser beam according to application. Even in this case, the polarization conversion device 25 may be used as a ½ wavelength plate. Also, for a polarization conversion device which functions as a ¼ wavelength plate, the polarization conversion device 25 may be solely used as a ¼ wavelength plate. Also, since conversion into a desired direction can be made by rotating the polarization direction in two steps using two polarization conversion devices as shown in FIG. 13, rotating the polarization direction by an arbitrary angle in three or four steps is also theoretically possible by combining three or four polarization conversion devices at appropriate angles, for example.

What is claimed is:

1. A polarization conversion device, wherein when either one of a first linearly polarized light beam and a second linearly polarized light beam whose polarization directions are perpendicular to each other is incident, the polarization conversion device converts the one into the other linearly polarized light beam, the polarization conversion device comprising:
- a prism sheet including a plurality of long-and-narrow rectangular prism elements which are arranged so that edge lines, each of which is formed of a pair of inclined surfaces of the corresponding long-and-narrow rectangular prism element, are parallel to each other and lie in a same plane; and
- a retardation film that is formed on each inclined surface so that an optical axis of the retardation film matches a normal line of each inclined surface of the rectangular prism element, the retardation film that is formed of a dielectric multilayer which gives a phase difference of a ½ wavelength to light being incident on the prism sheet substantially vertically from a bottom-surface side of the rectangular prism elements and being transmitted through the prism sheet, wherein
- the rectangular prism elements are arranged so that the edge lines are inclined by about 45° with respect to the polarization direction of the one linearly polarized light beam.

2. A polarization conversion device, wherein when either one of a first linearly polarized light beam and a second linearly polarized light beam whose polarization directions are perpendicular to each other is incident, the polarization conversion device converts the one into the other linearly polarized light beam, the polarization conversion device comprising:
- two polarization conversion elements each of which includes
  - a prism sheet including a plurality of long-and-narrow rectangular prism elements which are arranged so that edge lines, each of which is formed of a pair of inclined surfaces of the corresponding long-and-narrow rectangular prism element, are parallel to each other and lie in a same plane, and
  - a retardation film that is formed on each inclined surface so that an optical axis of the retardation film matches a normal line of each inclined surface of the rectangular prism element, the retardation film which is formed of a dielectric multilayer which gives a phase difference of a ¼ wavelength to light being incident on the prism sheet substantially vertically from a bottom-surface side of the rectangular prism elements and being transmitted through the prism sheet, wherein
- the polarization conversion elements are arranged so that the edge lines are parallel to each other and are inclined by about 45° with respect to the polarization direction of the one linearly polarized light beam.

3. A polarization conversion device, wherein when either one of a first linearly polarized light beam and a second linearly polarized light beam whose polarization directions are perpendicular to each other is incident, the polarization conversion device converts the one into the other linearly polarized light beam, the polarization conversion device comprising:
- two polarization conversion elements each of which includes
  - a prism sheet including a plurality of long-and-narrow rectangular prism elements which are arranged so that edge lines, each of which is formed of a pair of inclined surfaces of the corresponding long-and-narrow rectangular prism element, are parallel to each other and lie in a same plane, and
  - a retardation film that is formed on each inclined surface so that an optical axis of the retardation film matches a normal line of each inclined surface of the rectangular prism element, the polarization conversion elements each of which formed of a dielectric multilayer which gives a phase difference of a ¼ wavelength to light being incident on the prism sheet substantially vertically from a bottom-surface side of the rectangular prism elements and being transmitted through the prism sheet, wherein
- one of the polarization conversion elements is arranged so that the edge lines of the one of the polarization conversion elements are inclined by an angle $\theta 1$ with respect to the polarization direction of the one linearly polarized light beam,
- the other polarization conversion element is arranged so that the edge lines of the other polarization conversion element are inclined by an angle $\theta 2$ with respect to the polarization direction of the one linearly polarized light beam, and
- $2\times(\theta 1-\theta 2)$ is substantially equal to 90°.

4. The polarization conversion device according to claim 3, wherein $$60°\leq \theta 1 \leq 70° \text{ and}$$

$$15°\leq \theta 2 \leq 25°.$$

5. A polarized illumination optical device comprising:
- a polarized beam splitter including a polarizing split layer on a bonding surface between prisms, the polarized beam splitter that transmits one of first and second linearly polarized light beams whose polarization directions are perpendicular to each other, out of non-polarized light beams incident on the polarizing split layer, the polarized beam splitter that reflects the other of the first and second linearly polarized light beams; and
- the polarization conversion device according to claim 1 that is bonded to an emission surface of the polarized beam splitter from which the other linearly polarized light beam reflected by the polarizing split layer is emitted, wherein
- the non-polarized light beams being incident on the polarized beam splitter from an illumination light source is converted into polarized illumination light consisting of (i) the one linearly polarized light beam, which is transmitted through the polarizing split layer, and (ii) the other linearly polarized light beam, which is reflected by the polarizing split layer and whose polarization direction is rotated by 90° after being transmitted through the polarization conversion device.

6. The polarized illumination optical device according to claim 5, wherein the plurality of polarized beam splitters are arranged so that the edge lines of the rectangular prism elements are parallel to each other and lie in the same plane.

7. An Liquid crystal projector comprising:
- an illumination optical system that divides illumination light from a light source lamp using a pair of microlens arrays, in which a plurality of microlenses is arranged, and that emits the divided illumination light beams so as to be superimposed on a liquid crystal display panel; and the polarized illumination optical device according to claim 5 that is provided immediately after an emission surface of the pair of microlens arrays.

8. An Liquid crystal projector comprising:
an illumination optical system that divides illumination light from a light source lamp using a pair of microlens arrays, in which a plurality of microlenses is arranged, and that emits the divided illumination light beams so as to be superimposed on a liquid crystal display panel; and
the polarized illumination optical device according to claim 6 that is provided immediately after an emission surface of the pair of microlens arrays.

9. A polarized illumination optical device comprising:
a polarized beam splitter including a polarizing split layer on a bonding surface between prisms, the polarized beam splitter that transmits one of first and second linearly polarized light beams whose polarization directions are perpendicular to each other, out of non-polarized light beams incident on the polarizing split layer, the polarized beam splitter that reflects the other of the first and second linearly polarized light beams; and
the polarization conversion device according to claim 2 that is bonded to an emission surface of the polarized beam splitter from which the other linearly polarized light beam reflected by the polarizing split layer is emitted, wherein
the non-polarized light beams being incident on the polarized beam splitter from an illumination light source is converted into polarized illumination light consisting of (i) the one linearly polarized light beam, which is transmitted through the polarizing split layer, and (ii) the other linearly polarized light beam, which is reflected by the polarizing split layer and whose polarization direction is rotated by 90° after being transmitted through the polarization conversion device.

10. The polarized illumination optical device according to claim 9, wherein the plurality of polarized beam splitters are arranged so that the edge lines of the rectangular prism elements are parallel to each other and lie in the same plane.

11. An Liquid crystal projector comprising:
an illumination optical system that divides illumination light from a light source lamp using a pair of microlens arrays, in which a plurality of microlenses is arranged, and that emits the divided illumination light beams so as to be superimposed on a liquid crystal display panel; and
the polarized illumination optical device according to claim 9 that is provided immediately after an emission surface of the pair of microlens arrays.

12. An Liquid crystal projector comprising:
an illumination optical system that divides illumination light from a light source lamp using a pair of microlens arrays, in which a plurality of microlenses is arranged, and that emits the divided illumination light beams so as to be superimposed on a liquid crystal display panel; and
the polarized illumination optical device according to claim 10 that is provided immediately after an emission surface of the pair of microlens arrays.

13. A polarized illumination optical device comprising:
a polarized beam splitter including a polarizing split layer on a bonding surface between prisms, the polarized beam splitter that transmits one of first and second linearly polarized light beams whose polarization directions are perpendicular to each other, out of non-polarized light beams incident on the polarizing split layer, the polarized beam splitter that reflects the other of the first and second linearly polarized light beams; and
the polarization conversion device according to claim 3 that is bonded to an emission surface of the polarized beam splitter from which the other linearly polarized light beam reflected by the polarizing split layer is emitted, wherein
the non-polarized light beams being incident on the polarized beam splitter from an illumination light source is converted into polarized illumination light consisting of (i) the one linearly polarized light beam, which is transmitted through the polarizing split layer, and (ii) the other linearly polarized light beam, which is reflected by the polarizing split layer and whose polarization direction is rotated by 90° after being transmitted through the polarization conversion device.

14. The polarized illumination optical device according to claim 13, wherein the plurality of polarized beam splitters are arranged so that the edge lines of the rectangular prism elements are parallel to each other and lie in the same plane.

15. An Liquid crystal projector comprising:
an illumination optical system that divides illumination light from a light source lamp using a pair of microlens arrays, in which a plurality of microlenses is arranged, and that emits the divided illumination light beams so as to be superimposed on a liquid crystal display panel; and
the polarized illumination optical device according to claim 13 that is provided immediately after an emission surface of the pair of microlens arrays.

16. An Liquid crystal projector comprising:
an illumination optical system that divides illumination light from a light source lamp using a pair of microlens arrays, in which a plurality of microlenses is arranged, and that emits the divided illumination light beams so as to be superimposed on a liquid crystal display panel; and
the polarized illumination optical device according to claim 14 that is provided immediately after an emission surface of the pair of microlens arrays.

17. A polarized illumination optical device comprising:
a polarized beam splitter including a polarizing split layer on a bonding surface between prisms, the polarized beam splitter that transmits one of first and second linearly polarized light beams whose polarization directions are perpendicular to each other, out of non-polarized light beams incident on the polarizing split layer, the polarized beam splitter that reflects the other of the first and second linearly polarized light beams; and
the polarization conversion device according to claim 4 that is bonded to an emission surface of the polarized beam splitter from which the other linearly polarized light beam reflected by the polarizing split layer is emitted, wherein
the non-polarized light beams being incident on the polarized beam splitter from an illumination light source is converted into polarized illumination light consisting of (i) the one linearly polarized light beam, which is transmitted through the polarizing split layer, and (ii) the other linearly polarized light beam, which is reflected by the polarizing split layer and whose polarization direction is rotated by 90° after being transmitted through the polarization conversion device.

18. The polarized illumination optical device according to claim 17, wherein the plurality of polarized beam splitters are arranged so that the edge lines of the rectangular prism elements are parallel to each other and lie in the same plane.

19. An Liquid crystal projector comprising:

an illumination optical system that divides illumination light from a light source lamp using a pair of microlens arrays, in which a plurality of microlenses is arranged, and that emits the divided illumination light beams so as to be superimposed on a liquid crystal display panel; and the polarized illumination optical device according to claim 17 that is provided immediately after an emission surface of the pair of microlens arrays.

20. An Liquid crystal projector comprising:

an illumination optical system that divides illumination light from a light source lamp using a pair of microlens arrays, in which a plurality of microlenses is arranged, and that emits the divided illumination light beams so as to be superimposed on a liquid crystal display panel; and the polarized illumination optical device according to claim 18 that is provided immediately after an emission surface of the pair of microlens arrays.

* * * * *